United States Patent
Meyer et al.

(10) Patent No.: US 6,446,215 B1
(45) Date of Patent: Sep. 3, 2002

(54) METHOD AND APPARATUS FOR CONTROLLING POWER MANAGEMENT STATE TRANSITIONS BETWEEN DEVICES CONNECTED VIA A CLOCK FORWARDED INTERFACE

(75) Inventors: Derrick R. Meyer, Austin, TX (US); Scott A. White, Austin, TX (US); Michael T. Clark, Austin, TX (US); Philip E. Madrid, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/378,026

(22) Filed: Aug. 20, 1999

(51) Int. Cl.$^7$ .............................. G06F 1/26; G06F 1/28; G06F 13/24
(52) U.S. Cl. ..................... 713/310; 713/322; 713/323; 710/262; 710/267
(58) Field of Search ................................ 713/310, 322, 713/323

(56) References Cited

U.S. PATENT DOCUMENTS

| | | | | |
|---|---|---|---|---|
| 5,740,454 A | * | 4/1998 | Kelly et al. | 395/750.03 |
| 6,085,330 A | * | 7/2000 | Hewitt et al. | 713/322 |
| 6,125,450 A | * | 9/2000 | Kardach | 713/323 |
| 6,292,865 B1 | * | 9/2001 | McTague et al. | 710/262 |
| 2001/0003206 A1 | * | 6/2001 | Pole, II et al. | 713/320 |

OTHER PUBLICATIONS

"Alpha 21264 Microprocessor Hardware Reference Manual," Compaq, 1999, pp. 3–1 to 3–20, 4–1 to 4–52, 7–1 to 7–21.

AMD5$_K$86™ Processor, Technical Reference Manual, Advanced Micro Devices, Inc., 1996, pp. 6–33 through 6–39 and pp. A–12 through A–13.

PowerPC™ 603, RISC Microprocessor User's Manual, Motorola, 1994, pp. 9–27 through 9–28 pp. B–1 and through B–5.

AMD–K6™ MMX Processor, Data Sheet, Advanced Micro Devices, Inc., 1997, pp. 6–40 through 6–41 and pp. 12–1 through 12–6.

* cited by examiner

Primary Examiner—Thomas Lee
Assistant Examiner—Suresh K. Suryawanshi
(74) Attorney, Agent, or Firm—Conley, Rose & Tayon, PC; Lawrence J. Merkel

(57) ABSTRACT

A method and apparatus for controlling power management state transitions between two devices, e.g., a processor and a bus bridge, that are connected through a clock forwarded interface bus in a computer system. The bus bridge is configured to coordinate disconnection of the processor from the interface. Particularly, the bus bridge may use a fist signal to indicate whether or not the processor is to be disconnected from the interface (e.g. a CONNECT signal) and the processor may use a second signal to indicate whether or not the processor is to be disconnected from the interface (e.g. a PROCREADY signal). The processor is disconnected from the interface responsive to both the first signal and the second signal indicating that the processor is to be disconnected. The signals may also be used to reconnect the processor to the interface.

34 Claims, 8 Drawing Sheets ents within the computer system. The bus
bridge is configured to coordinate disconnection of the
processor from the interface bus upon receiving from the
processor an indication of such disconnection. The proces-
METHOD AND APPARATUS FOR CONTROLLING POWER MANAGEMENT STATE TRANSITIONS BETWEEN DEVICES CONNECTED VIA A CLOCK FORWARDED INTERFACE

BACKGROUND OF THE INVENTION

1. Field of the Invention

This invention broadly relates to computer systems, and more particularly, to processor power management within a computer system where the processor is at one end of a clock forwarded interface.

2. Description of the Related Art

A computer system typically includes at least one processor (also referred to as a "microprocessor") that typically performs processing of a number of instructions from one or more programs or applications under execution. As part of its processing operations, the processor may need to access a number of system buses for required data transfer. For example, a multimedia application may require the processor to transfer certain data to a separate video processor and retrieve the processed information from the video processor through a dedicated video bus. Further, the processor may communicate with one or more I/O devices through a separate I/O bus, and with one or more system memories through a dedicated memory bus. Additional buses may be present in the computer system based on the system device complexity and the level of interconnection among various electronic devices constituting the computer system.

The computer system may also include a bus bridge to effectively manage the binary information traffic between the processor and one or more system buses. The bus bridge may also facilitate cache coherent data transfers within the system in view of the possibility of independent memory accesses by the processor and one or more I/O devices. Various system components may be coupled to the processor via the bus bridge. In other words, the bus bridge may be directly connected to the processor, and, hence, may directly receive all address and data information from the processor. The bus bridge may, in turn, distribute the received information to appropriate system devices via appropriate system buses. Similarly, information received from one or more system devices over different system buses may be routed to the processor via the bus bridge in a systematic manner.

The bus bridge may be connected to the processor via a clock forwarded interface for high bandwidth data transfers. A clock forwarded interface accomplishes point-to-point transfers of binary information by having the sender provide the receiver with a forward clock that latches the transmitted data at the receiver. The receiver may then sample the received binary information using its internal clock. The address and/or data transmitted by the sender is synchronized to the forward clock by the sender. The clock forwarded interface thus requires the processor and the bus bridge to begin sending forward clocks in a deterministic manner. Further, the forward clocks from the processor and the bus bridge may be of equal frequency to provide consistent reference points during binary information transfers between them.

The processor is a typical semiconductor device that dissipates electrical power (i.e., transforms electrical energy into heat energy) during operation. At the same time, several key operating parameters of a semiconductor electronic device vary with temperature, and reliable device operation within specifications occurs only within a defined operating temperature range. For example, the specified performance of the processor is typically achieved only when the temperature of the processor is maintained below a specified maximum operating temperature. Operation of the processor at a temperature above the maximum operating temperature may result in irreversible damage to the processor's internal circuitry. In addition, it has been established that the reliability of semiconductor electronic devices decreases with increasing operating temperature.

The electrical power dissipated by the processor directly depends, among other factors, on the speed (or frequency) at which the processor operates during run-time. The higher the operating frequency of the processor, the greater the generation of heat energy by the processor. However, the processor itself may be idle at various times during the length of program execution. For example, the processor may be waiting to receive a large stream of data from a video processor through the bus bridge, and the processor may not continue further program execution until it receives the requested data. In such an event, it may be desirable to place the idle processor into a low power consuming state by reducing the frequency of its internal clock. Operating the processor at its full internal frequency may not be desirable when the processor is idle.

In a clock forwarded interface, it is desirable that the processor not drive its forward clock to the bus bridge when the processor is in a low power state. It may therefore be desirable to allow the processor to enter and exit its low power state while also ensuring the requisite synchronism between the forward clocks from the processor and the bus bridge when the processor and the bus bridge are connected through a clock forwarded interface.

SUMMARY OF THE INVENTION

The problems outlined above may in large part be solved by a computer system as described herein. The computer system comprises a processor that is connected to a bus bridge via an interface bus, which, preferably, provides a clock forwarded interface between the processor and the bus bridge. The bus bridge, in turn, connects the processor to one or more system buses within the computer system. The bus bridge is configured to coordinate disconnection of the processor from the interface bus upon receiving from the processor an indication of such disconnection. The processor may be disconnected from the interface bus when the processor is idle.

In one embodiment, the computer system may further comprise an I/O bridge connected to the bus bridge via one of the system buses. The I/O bridge may further be connected to an I/O interrupt controller through an I/O bus to manage the interrupt traffic within the system as well as to provide an interface between the processor and one or more I/O devices within the system. In one embodiment, the I/O bridge provides a number of interrupt signals directly to the processor via corresponding pins directly connecting the processor and the I/O bridge.

The interface bus may include a CONNECT line, a PROCREADY line, a CLKFWDRESET line, and other data and address lines. The CONNECT and the CLKFW-DRESET lines are sourced by the bus bridge, whereas the PROCREADY line is sourced by the processor. In one embodiment, the processor gets connected to the interface bus when both the CONNECT and the PROCREADY signals are asserted. The processor remains connected to the interface bus despite deassertion of one of these two signals. However, the processor may get disconnected from the interface bus when both the CONNECT and the PROCRE- ADY signals are deasserted. The processor remains disconnected so long as both of these signals are not asserted.

Generally, the CONNECT and the PROCREADY signals are used to provide an orderly disconnection of the processor from the bus interface. Various transactions which are initiated in the computer system may require multiple communications across the interface bus. It is therefore desirable to complete outstanding transactions prior to disconnecting the processor from the bus interface.

In one embodiment, the processor may receive an indication of its disconnection from the interface bus when the I/O bridge asserts the STPCLK_L line or when the processor executes a HALT instruction. With the PROCREADY and the CONNECT lines still asserted, the processor's microcode may mask the CONNECT line recognition until the processor's bus interface unit becomes free. Thereafter, the bus bridge may first deassert the CONNECT line after verifying that no probes to the processor are pending in the system. The processor may then responsively deassert the PROCREADY signal unless the processor is to remain connected to the interface bus to complete one or more transactions. In that event, the processor issues a connect special cycle command to the bus bridge, which, in turn, reasserts the CONNECT signal until the desired transactions are completed.

After the deassertion of the PROCREADY signal, the bus bridge asserts the CLKFWDRESET signal. In one embodiment, the assertion of the CLKFWDRESET signal results in resetting of the clock forwarded interface. In other words, the processor and the bus bridge both stop their respective forward clocks and clear their respective clock forwarded data/address FIFOs. The processor may then ramp down its internal clock to a low frequency (i.e., the processor may enter its "asleep" state) to save power. The processor may remain disconnected from the interface bus when asleep, and may remain in this disconnected state until reconnected to the interface bus. Additional power may be conserved due to the reset of the clock forwarded interface (since the forward clocks are not toggling).

The processor may be reconnected to the interface bus when it is "awake", i.e., when the processor clock is running at its full frequency. The reconnection of the processor to the interface bus may depend on how the processor was earlier disconnected. The reconnection may be permanent or temporary. For example, in one embodiment, a deassertion of the STPCLK_L line may initiate a permanent reconnection of the processor in the event that the processor was earlier disconnected by the assertion of the STPCLK_L signal. Similarly, one or more of a number of interrupt signals from the I/O bridge may also permanently reconnect the processor in the event that the processor was put to sleep by the execution of the HALT instruction. However, the bus bridge may make the processor temporarily reconnect to the interface bus if the bus bridge needs to send a probe to the processor. The processor may also get temporarily reconnected to the interface bus upon assertion of the STPCLK_L signal while in the disconnected state through the execution of the HALT instruction.

As part of the reconnection, the processor ramps up its internal clock to its full frequency and asserts the PROCREADY signal. The bus bridge, in response, asserts the CONNECT signal and deasserts the CLKFWDRESET line. This causes the system forward clocks to begin and either party (the bus bridge or the processor) may begin the data transfer activity. The synchronism between the forward clocks from the processor and the bus bridge is thus maintained during disconnection and reconnection of the processor to the interface bus. Power conservation is also achieved by placing the idle processor in a low frequency state and by stopping the forward clocks.

BRIEF DESCRIPTION OF THE DRAWINGS

A better understanding of the present invention can be obtained when the following detailed description of the preferred embodiment is considered in conjunction with the following drawings, in which.

DESCRIPTION OF PREFERRED EMBODIMENTS

Figure 1:
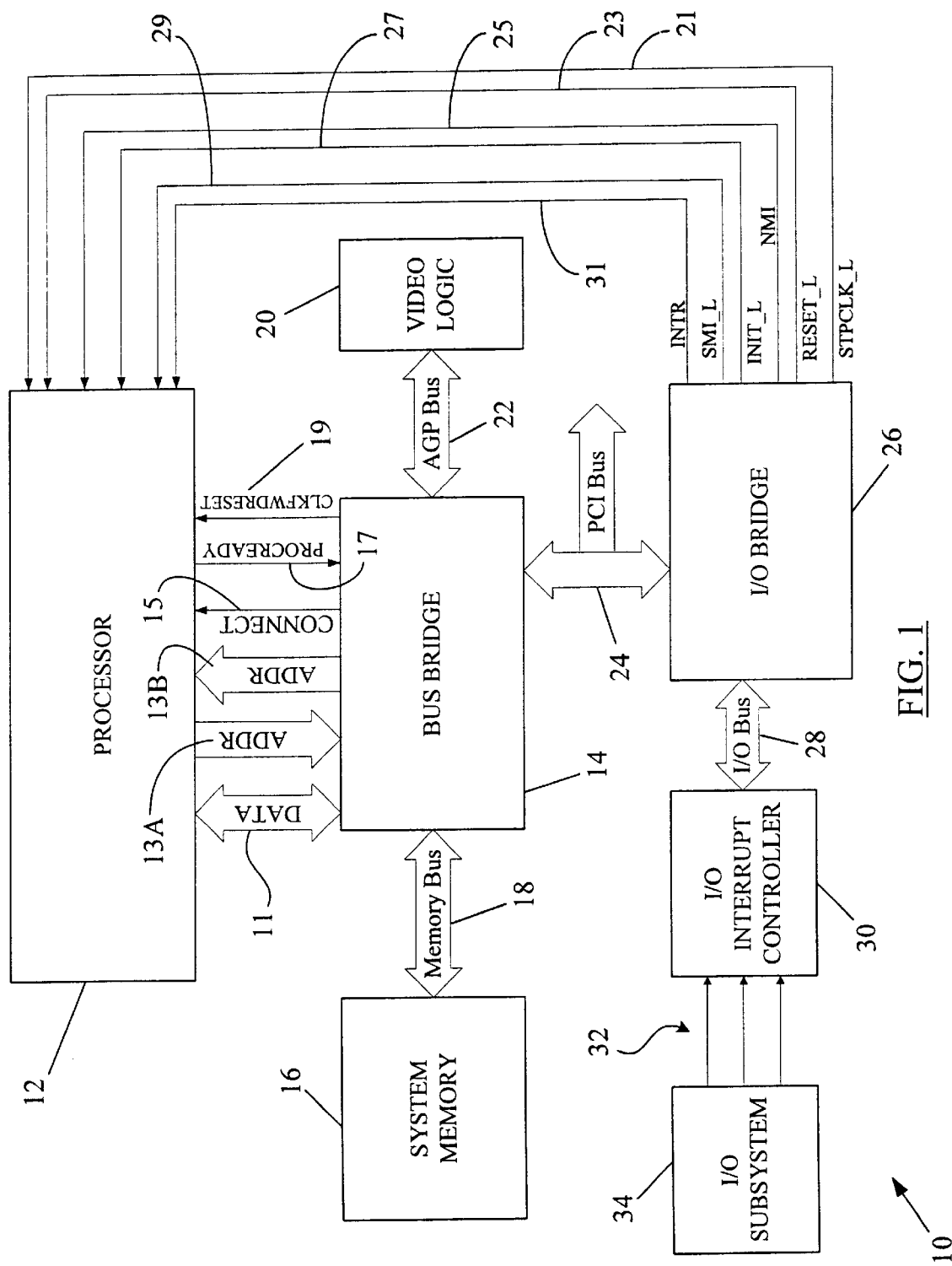
FIG. 1 depicts a computer system employing a clock forwarded interface between a processor and a bus bridge.

Referring now to FIG. 1, a computer system 10 with a processor 12 and a bus bridge 14 is illustrated. The processor 12 may be connected to the bus bridge 14 through a plurality of lines or pins on the processor as well as on the bus bridge. In the embodiment in FIG. 1, a bi-directional data bus 11, two unidirectional address buses 13A–13B, a CONNECT line 15, a PROCREADY line 17 and a CLKFWDRESET 19 line are shown connecting the processor 12 and the bus bridge 14. Additional lines may be present between the processor and the bus bridge, but are not shown for the sake of simplicity of the discussion.

The disconnection and the reconnection of the processor 12 using the CONNECT, the PROCREADY and the CLKFWDRESET lines to conserve power in the system 10 are described later in detail. However, it is briefly noted at the outset that when the processor 12 enters its "disconnected" state, the processor may not be capable of transmitting or receiving information from the bus bridge 14 using one or more of the interconnect buses 11, 13A and 13B. On the other hand, when the processor 12 exits its disconnected state and enters into its "connected" state, the processor may reestablish a connection with the bus bridge 14 to perform transactions involving digital information transfers across one or more of the interconnect buses 11, 13A and 13B.

The bus bridge 14 manages the binary information traffic between the processor 12 and one or more system buses within the computer system 10. FIG. 1 illustrates some of the system buses connecting respective circuit elements to the bus bridge 14. For example, the processor 12 may access a system memory 16 via the bus bridge and through a dedicated memory bus 18. The processor 12 may further access a multimedia or video logic circuitry 20 through a dedicated AGP (Advanced Graphics Port) bus 22 via the bus bridge 14. The video logic 20 may include circuitry to process large streams of video data from various multimedia applications being executed by the processor. The system memory may comprise one or more RAMBUS DRAMs (RDRAMs), synchronous DRAMs (SDRAMs), static RAM, etc. The system may further include a cache memory (not shown) that is directly (i.e., not through the bus bridge 14) connected to the processor 12 via another memory bus.

In one embodiment, the computer system 10 may also include an I/O bridge 26 coupled to the bus bridge 14 via an expansion bus, e.g., a PCI (Peripheral Component Interconnect) bus 24. The PCI bus 24 may also connect to other peripheral devices in the system, such as storage disk drives (not shown). The bus bridge 14 may be referred to as a "primary bus bridge" because of its direct connection to the processor 12. The I/O bridge 26, however, may be referred to as a "secondary bus bridge" that is not directly connected to the processor, but that connects other system components to the processor 12 through the intervening primary bus bridge 14. I/O bridge 26 may be coupled to an I/O interrupt controller 30 via a dedicated I/O bus 28, e.g., an ISA (Industry Standard Architecture) bus.

The I/O bus 28 is generally a bi-directional bus that carries interrupt messages from the I/O interrupt controller 30 to the I/O bridge 26 and vice versa. An I/O subsystem 34 is shown connected to the I/O interrupt controller 30 through a set of interrupt lines 32. In one embodiment, the I/O subsystem 34 may also be directly connected to the I/O bridge 26 via the I/O bus 28. In other words, the I/O bus 28 may connect to the I/O interrupt controller 30 as well as the I/O subsystem 34. In such an embodiment, the I/O bus 28 may also carry various information transfers (unrelated to interrupts) directly between the I/O subsystem 34 and the I/O bridge 26.

The I/O subsystem 34 may include various interrupt generating mechanisms and sources including, for example, a keyboard, a printer, a timer, a mouse, etc. Other I/O devices that generate software or hardware interrupts in the system may also be included as part of the I/O subsystem. More than one I/O device may transmit an interrupt request over a corresponding interrupt line 32. However, the I/O interrupt controller 30 may queue interrupt requests based on their priorities or based on any other predetermined interrupt message transfer algorithm.

The embodiment in FIG. 1 illustrates the I/O interrupt controller 30 to be an external discrete device that is coupled to the I/O bridge 26. In an alternative embodiment, the I/O bridge 26 may include the I/O interrupt controller 30, and, hence, a discrete I/O interrupt controller may be absent. In that situation, the I/O bridge 26 may directly receive interrupt requests from corresponding I/O devices constituting the I/O subsystem 34. It is further noted that the embodiment in FIG. 1 illustrates only one processor with one bus bridge and one I/O bridge. However, the discussion herein equally applies to a multiprocessor system with a plurality of processors and a plurality of corresponding bus bridges and I/O bridges constituting the multiprocessor system. In one embodiment, the bus bridge 14 may be shared by two or more processors in the system.

FIG. 1 also illustrates the direct connection of the I/O bridge 26 and the processor 12 through a set of dedicated lines (or pins) for a number of hardware interrupt signals 21, 23, 25, 27, 29 and 31. The interrupt signals may be level-triggered or edge-triggered depending on the design choice. The I/O bridge 26 may interrupt the processor through assertion of one or more of the interrupt signals. FIG. 1 shows some exemplary interrupt signals, such as, the INTR (Interrupt) signal 31, the SMI (System Management Interrupt) signal 29, the INIT (Initialization) interrupt signal 27, the NMI (Non-Maskable Interrupt) signal 25, the RESET (system reset) signal 23, and the STPCLK (Stop Clock) interrupt signal 21. The signals that are active low are indicated by the letter "L" following the name of the signal and separated from the name of the signal by an underscore. Any other notation to represent various signals in the system 10 in FIG. 1 may also be conveniently adopted.

In a positive logic notation, a signal may be considered "asserted" when it is active high, i.e., when the signal represents a logical one as a high voltage on the corresponding line (or pin) carrying that signal. The signal may be considered "deasserted" when the signal represents a logical zero as a low voltage. However, in a negative logic notation, a signal may be considered "asserted" when the signal represents a logical one as a low voltage on the corresponding line carrying that signal. The signal may be considered "deasserted" when it represents a logical zero as a high voltage. A suitable combination of positive and negative logic for different signals within the system 10 may also be implemented.

In one embodiment, the INTR interrupt signal, when asserted, signals initiation of a vectored interrupt to the processor 12. The processor 12, in response to an asserted INTR interrupt signal, starts an interrupt acknowledge transaction that fetches the interrupt vector and starts execution of the interrupt service routine stored at the location given by the interrupt vector. In the preferred embodiment, the interrupt vector is eight bits long. The SMI, NMI, IMT, RESET and STPCLK interrupt signals, however, are generally non-vectored interrupts. The SMI interrupt may be asserted by the I/O bridge 26 to request the processor to enter the system management mode. The INIT interrupt, when asserted, resets the integer registers within the processor 12 without affecting the floating-point registers or the internal caches within the processor. The NMI interrupt, as its name suggests, may not be generally masked by the processor 12 and the processor may place the NMI interrupt immediately into service upon receipt. The RESET signal, when asserted, causes the initialization of all processor states and invalidates cache block without writing back the previous data. Finally, the STPCLK signal, upon assertion, causes the processor to issue a STOP GRANT transaction (described later) and enter into a low power state.

Figure 2:
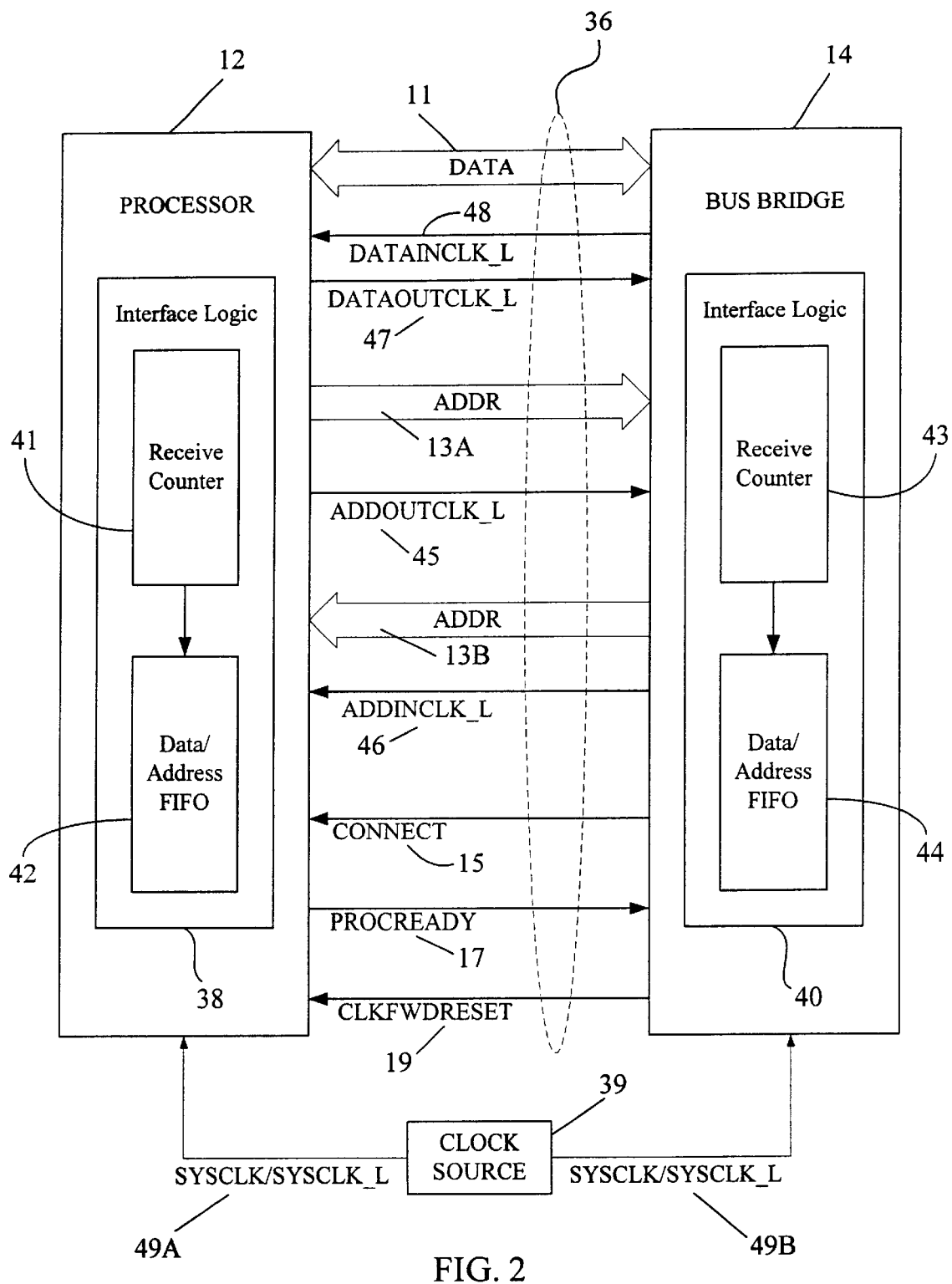
FIG. 2 illustrates in detail the interface bus connecting the processor and the bus bridge. Exemplary interface logic units in the processor and the bus bridge as well as the forward clocks of the interface bus are also shown.

Turning now to FIG. 2, a detailed illustration of an interface bus 36 connecting the processor and the bus bridge is shown. The interface bus 36 may include the processor data bus 11, the processor address bus 13A, the bus bridge address bus 13B, and the control pins including the CONNECT line 15, the PROCREADY line 17 and the CLKFWDRESET line 19. The interface bus 36 may also include other bus lines and control lines (or pins), e.g., the forwarded clocks 45–48 as discussed later. The data bus 11 is bi-directional, whereas both of the address buses 13A–13B are unidirectional. In one embodiment, the width of the data bus 11 may be 64 bits, whereas each address bus 13A–13B may be of 13 bits wide for a point-to-point transfer of binary information between the processor and the bus bridge.

In one embodiment, the address buses 13A–13B and the data bus 11 within the system 10 carry digital information in the form of binary packets. The content of a binary packet will primarily depend on the type of operation and on the initiator of the operation. A system clock source 39 may be present in the system 10 to provide a differential clock pair 49A (SYSCLK/SYSCLK_L) for the processor 12 and another similar differential clock pair 49B for the bus bridge 14. A clock from the differential clock pair SYSCLK/SYSCLK_L may be referred to as the "system clock." The processor internal clock or PLL (Phase Locked Loop) and the bus bridge internal clock (both not shown in FIG. 2) may be generated with reference to the respective system clocks 49A and 49B. The system clock may also be used to determine the bit rate for the binary information travelling over the interface bus 36.

In the preferred embodiment, one bit of digital information per address or data line is transmitted on each edge (i.e., the rising edge and the falling edge) of the system clock. Accordingly, two bits may be transmitted per line (i.e., an address line or a data line) per clock cycle of the system clock. The amount of time employed to transmit one bit per line may be referred to as a "bit time." Thus, in the preferred embodiment, a clock cycle of the system clock includes two bit times. A binary packet (on an address bus or on the data bus) may therefore be transmitted across two or more bit times.

Preferably, the interface bus 36 is a clock forwarded interface bus. In a clock forwarded interface, the sender of the binary information provides the receiver with a forward clock that latches the transmitted data at the receiver. The receiver may then sample the received binary information using its own internal clock. The address and/or data transmitted by the sender is synchronized to the forward clock by the sender.

FIG. 2 also illustrates an exemplary set of forward clocks for the clock forwarded interface bus 36. The forward clocks for the data bus 11 are referred to as DATAINCLK_L 48 and DATAOUTCLK_L 47 depending on the sender of the data. The forward clock for the bus bridge address bus 13B is referred to as ADDINCLK_L 46. Finally, the forward clock corresponding to the processor address bus 13A is shown as the ADDOUTCLK_L signal 45. In the preferred embodiment, each forward clock, 47 and 48, for the data bus 11 includes four clock lines. However, each forward clock for the corresponding address bus, i.e., clocks 45 and 46, may include a single clock line. The forward clocks 45–48 may run at the same frequency as the system clock (SYSCLK or SYSCLK_L), or at twice the frequency of the system clock. As both the edges of each forward clock may be used to transmit corresponding address or data bits, the effective bit rate may be either twice or four times the frequency of the system clock. For example, if the system clock and the forward clocks are operating at 100 MHz, then the effective bit rate of the forward clocks is 200 MHz.

As mentioned earlier, ADDOUTCLK_L 45 and DATAOUTCLK_L 47 lines provide the forwarding clocks for binary information transfers from the processor to the bus bridge. Whereas, ADDINCLK_L 46 and DATAINCLK_L 48 signals provide the forwarding clocks for binary information transfers into the processor from the bus bridge. When the processor 12 receives forwarded data from the bus bridge 14, the processor latches that data using the skewed-aligned forwarded clock (DATAINCLK_L) provided by the bus bridge. Similarly, the bus bridge 14 may latch the received data using the forwarded clock DATAOUTCLK_L from the processor 12.

FIG. 2 illustrates an example of the interface logic units 38 and 40 in the processor and in the bus bridge respectively. The data received through the corresponding forwarded clocks may be processed in the respective interface logic unit (38 or 40) in the receiver. In one embodiment, each interface logic unit includes identical digital circuits. For example, the processor interface logic unit 38 may include a receive counter 41 and a data/address FIFO (First In First Out) 42; and the bus bridge interface logic unit 40 may similarly include another receive counter 43 and another data/address FIFO 44. In one embodiment, the processor and the bus bridge may latch the received address or data bits using the respective receive counters (41 or 43) and corresponding forward clocks associated with the received address or data bits. However, the processor and the bus bridge may sample the clock forwarded address or data bits using their respective internal clocks, and not using the clocks forwarded from the sender.

The data and/or address information received at the processor or the bus bridge may be latched into the respective data/address FIFO. The depth of each data/address FIFO 42 and 44 may depend on the width of the data and address buses in the interface bus 36. Further, the depth of each data/address FIFO 42 and 44 may be chosen to compensate for the worst-case delay from the sender to the receiver (i.e., the "trace delay" on the motherboard carrying the processor 12 and the bus bridge 14), total uncertainty between the sampling edges of the receiver's internal clock (e.g., processor internal clock) and the forwarded clock, setup and hold times for each latch within the FIFO, and the bit time (which is one half the forwarded clock period in the event that both the edges of the forwarded clock are used to transmit a bit of binary data).

In one embodiment, each of the data/address FIFOs 42 and 44 includes eight receive entries per address and data buses. For example, the FIFO 44 may have a first set of eight receive entries for the bits received on the address bus 13A and a second set of eight receive entries for the bits received on the data bus 11. In an alternate embodiment, there may be two separate FIFOs (preferably with different depths) in one or both of the interface logic units. For example, the processor interface logic unit 38 may have one FIFO for data bits received on the data bus 11 and another separate FIFO for address bits received from the bus bridge address bus 13B. The bus bridge interface logic unit 40 may also have a similar configuration.

Each receive counter 41 and 43 provides a mechanism to select a respective one of the entries in the data/address FIFO to latch each received data and/or address information. Upon assertion of the CLKFWDRESET signal 19, the processor 12 initializes or resets its receive counter 41 to point to the count value zero on the first asserted edge of the data or address forward clock (for example, the DATAINCLK_L) recognized by the processor. As discussed later, in the preferred embodiment, the CLKFWDRESET signal 19 may remain asserted after the processor is disconnected from the interface bus 36 and until the processor is reconnected to the interface bus 36.

The resetting of the receive counter 41 results in the selection of the first entry in the data/address FIFO 42 to latch the data associated with the first asserted edge of the data forward clock 48. The receive counter 41 is incremented by the transmitter's forward clock (here, the DATAINCLK_L), and, hence, each data bit is latched in a corresponding one of the entries in the data/address FIFO 42. The address information may be latched in a similar manner in another portion of the data/address FIFO 42 using the corresponding forward clock from the sender (here, the ADDIINCLK_L). The data/address FIFO 44 in the bus bridge interface logic unit 40 may also operate similarly to latch address and/or data information from the processor 12.

The receiver (i.e., the bus bridge 14 or the processor 12) may sample the latched address and/or data information at a frequency that is higher than the frequency of the associated forward clock from the sender (i.e., the bus bridge 14 or the processor 12) that was used to initially latch the data in the interface logic unit in the receiver. For example, in the case of the processor 12, the sampling may be in the processor clock (PLL) domain. The sampled address and/or data information is then processed by the processor in accordance with the corresponding application being executed. The sampling of the address and/or data may be accomplished by using a multiplexer coupled to receive the latched address and/or data from the data/address FIFO 42 and another counter to select the multiplexed output from the multiplexer. The multiplexer and the counter for the multiplexer are not shown in FIG. 2 for the sake of clarity. As the processor's forwarded clocks (e.g., the DATAOUTCLK_L signal 47) are skewed-aligned with the processor's internal clock (PLL), the counter for the multiplexer may be incremented by the internal processor clock to sample the latched address and/or data information at the frequency of internal processor clock.

As mentioned earlier, the internal clocks for the processor 12 and the bus bridge 14 may have different frequencies. Further, the forwarded clocks (i.e., the DATAOUTCLK_L and the ADDOUTCLK_L) from the processor 12 may have substantially identical frequency; and, similarly, the forwarded clocks (i.e., the DATAINCLK_L and the ADDINCLK_L) from the bus bridge 14 may have substantially identical frequency. Preferably, the processor's forwarded clocks and the bus bridge's forwarded clocks may all be of the same frequency. However, in one embodiment, the frequency of the forwarded clocks from the processor may be different from that of the forwarded clocks from the bus bridge.

It is noted that the following discussion mentions only the term "data" for the sake of clarity. However, the discussion equally applies (whenever applicable, and with corresponding signal modifications) to any address information travelling across the interface bus 36 with or without associated data.

Prior to or after asserting the CLKFWDRESET signal 19, but before commencing to receive data from the processor after the processor is reconnected to the interface bus 36, the bus bridge may internally reset its receive counter 43 in a way similar to the resetting of the processor's receive counter 41 described earlier. Thus, the data forward clock (i.e., the DATAOUTCLK_L) that is recognized by the bus bridge after the deassertion of the CLKFWDRESET signal will increment the receive counter 43 and will, therefore, assist in latching the associated data received from the processor 12 in a manner similar to that described for the receive counter 41 and the data FIFO 42 for the processor 12.

In the preferred embodiment, the processor 12 and the bus bridge 14 may communicate the processor's state of being "awake" or "asleep" via the three pins (CONNECT, PROCREADY and CLKFWDRESET) between the two chips. The processor may be considered "awake" when all the internal clocks within the processor 12 are running at full frequency. Further, the processor may be considered "asleep" when all the internal clocks within the processor 12 are running at a low frequency to save power, e.g., $\frac{1}{8}^{th}$ of the full frequency. The processor's state of being "awake" may correspond to the interface bus' state of being "connected" (to the processor). Finally, the processor's state of being "asleep" may correspond to the "disconnected" state of the interface bus 36.

The CONNECT pin 15 may be sourced by the bus bridge 14 and may reflect the bus bridge's view as to the state of the interface bus 36. In one embodiment, the transition of the CONNECT pin from a logical zero to a logical one may indicate that the bus bridge is ready to begin initiating and processing bus commands associated with the interface bus. On the other hand, the transition of the CONNECT pin from the logical one to the logical zero, i.e., the deassertion of the CONNECT pin by the bus bridge, may indicate that the bus bridge is ready to disconnect the processor from the interface bus.

The PROCREADY (processor ready) pin 17 may be sourced by the processor 12 and may, therefore, reflect the processor's view as to the state of the interface bus 36. In one embodiment, the transition of the PROCREADY pin from a logical zero to a logical one may indicate that the processor is ready to begin initiating and processing bus commands associated with the interface bus. On the other hand, the transition of the PROCREADY signal from the logical one to the logical zero, i.e., the deassertion of the PROCREADY signal by the processor, may complete the processor's disconnection from the interface bus given that the CONNECT pin has already been deasserted by the bus bridge. In other words, the deassertion of the PROCREADY pin in response to the previous deassertion of the CONNECT pin may completely disconnect the processor from the interface bus 36.

As mentioned earlier, a clock forwarded interface bus may require the sender and the receiver devices to exchange forward clocks in a deterministic manner. In the preferred embodiment, the protocol implementing the interface bus 36 may require the processor 12 and the bus bridge 14 to exchange forward clocks of equal frequency at all times. However, when the processor enters into a low power or "asleep" state, the processor may not drive the processor's forward clocks to the bus bridge during that low power state. It may therefore be desirable to reset the clock forwarded interface logic units within the processor and the bus bridge, i.e., units 38 and 40 respectively, when the processor leaves its low power state and gets connected to the interface bus 36. In other words, the bus bridge 14 may "wake up" in concert with the processor 12. Therefore, the bus bridge 14 may need to know when the processor is going to enter its low power state so that the bus bridge may stop sending forward clocks and associated data to the processor. Preferably, the bus bridge may itself enter into a low power state in concert with the processor, and may then exit the low power state when the processor does so.

The CLKFWDRESET (clock forward reset) signal 19, when asserted, may help accomplish the task of synchronously resetting the clock forwarded interface logic units 38 and 40 within the processor 12 and the bus bridge 14 respectively prior to the reconnection of the processor to the interface bus 36. The term "synchronous resetting" implies that the processor interface logic unit 38 and the bus bridge interface logic unit 40 may reset their respective receive counters and clear out their respective data/address FIFOs in synchronism with each other. Further, in one embodiment, the term "synchronous resetting" may also include cessation of transmission of the forward clocks (by the processor 12 and/or the bus bridge 14) across the interface bus 36. The CLKFWDRESET pin 19 may be sourced by the bus bridge as shown in FIGS. 1 and 2.

The assertion of the CLKFWDRESET signal may result in resetting of the receive counters 41 and 43, and may further result in clearing out of the clock forwarded data/address FIFOs 38 and 40. Further, as mentioned earlier, the forwarded clocks from the processor (e.g., DATAOUTCLK_L 47 and ADDOUTCLK_L 45) and those from the bus bridge (e.g., DATAINCLK_L 48 and ADDINCLK_L 46) may also get disabled when CLKFWDRESET is asserted. Disabling the forwarded clocks allows the processor receive counter 41, which is cleared by the processor but clocked by the bus bridge's forward clock, to be deterministically cleared with respect to the bus bridge's forwarded clocks. This is desirable to maintain the integrity of the clock forwarded interface and also to conserve power in the absence of address and/or data information transmission between the processor 12 and the bus bridge 14 across the interface bus 36.

Figure 3:
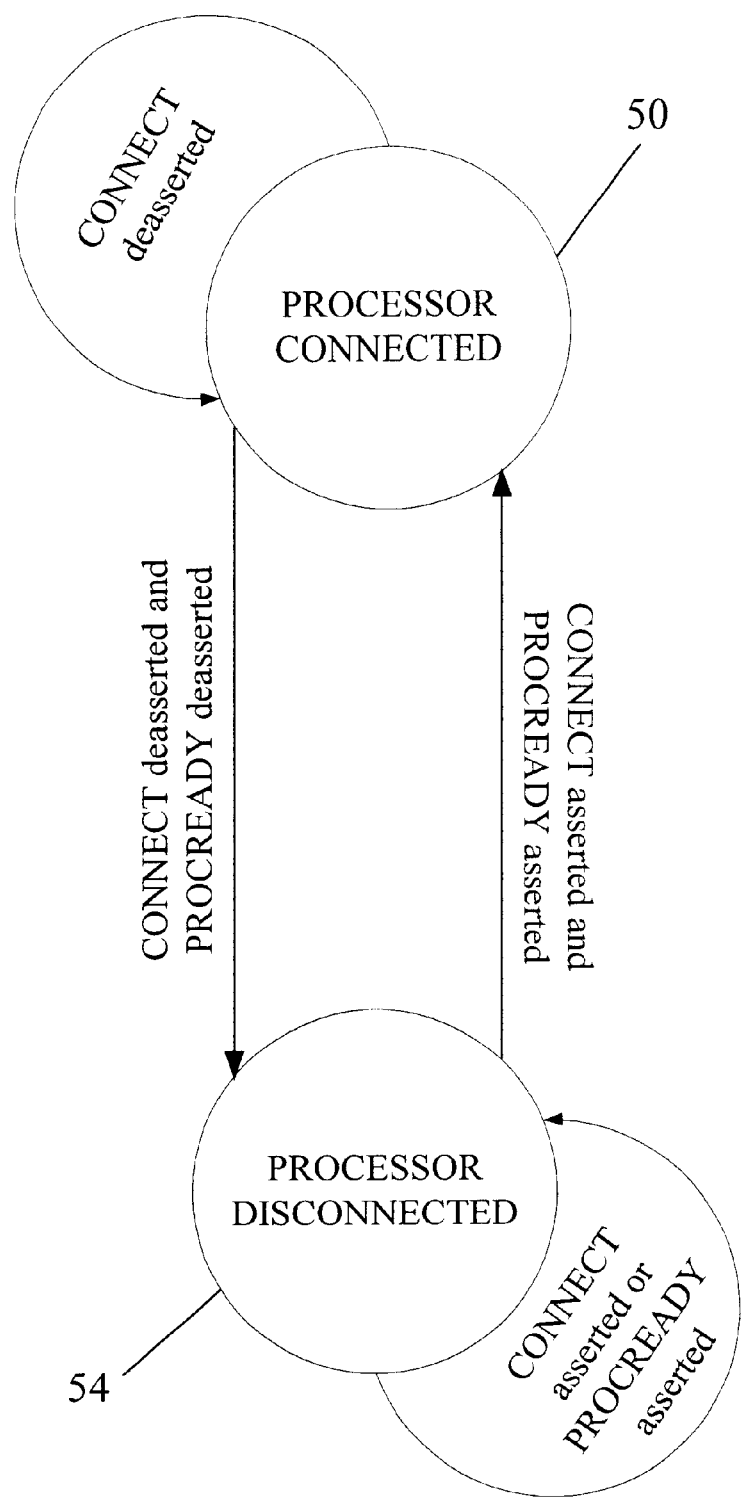
FIG. 3 shows exemplary transitions of the processor between its connected and disconnected states.

Turning now to FIG. 3, some exemplary transitions of the processor 12 between its connected and disconnected states are illustrated. Generally, the processor 12 may be in its "connected state" 50 when both the CONNECT and the PROCREADY pins are asserted. Once connected to the interface bus, the processor remains connected thereto even when the CONNECT pin is deasserted. However, the processor may enter into its "disconnected state" 54 when both of the CONNECT and the PROCREADY signals are deasserted. The processor, upon disconnection from the interface bus, may still remain disconnected even if only one of the CONNECT and the PROCREADY pins is asserted. In the following discussion, the term "permanent" or "permanently" refers to the processor's "connected" or "disconnected" states that are stable, as opposed to those states that are "temporary." In other words, the processor may revert to a "permanent" state upon completion of the task associated with a "temporary" state as discussed later.

Figure 4:
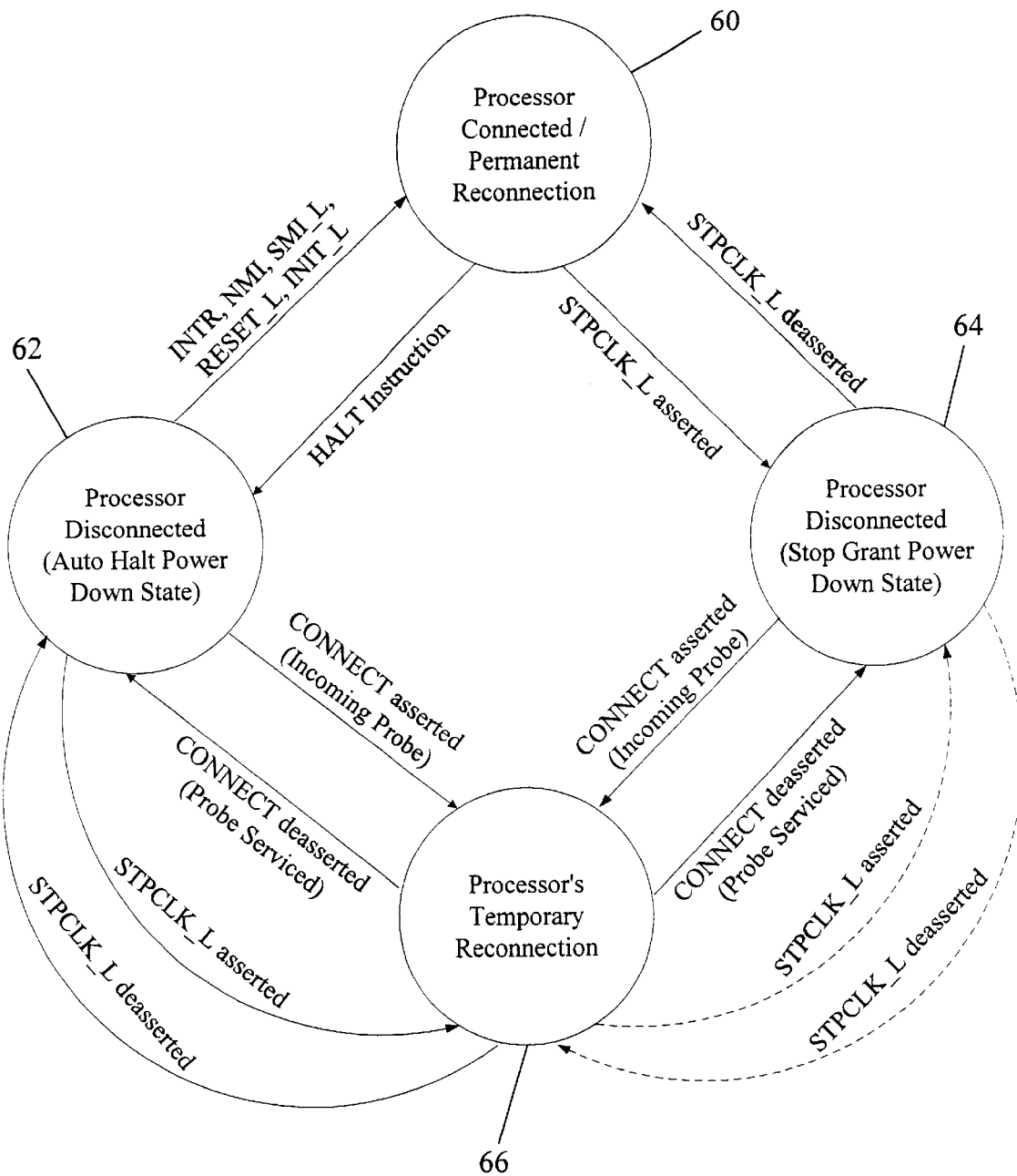
FIG. 4 depicts various state transitions and the signals associated therewith during the disconnection and the reconnection of the processor to the interface bus.

FIG. 4 depicts various state transitions and the signals associated therewith during the disconnection and the reconnection of the processor 12 to the interface bus 36. The processor may self-initiate its disconnection from the interface bus when idle. However, the processor may also get disconnected from the interface bus either when the I/O bridge 26 (FIG. 1) asserts the STPCLK_L pin or when the processor executes a HALT instruction. Generally, a HALT instruction is supplied by a program being executed by the processor 12 and functions as a software-initiated power down signal for the processor 12.

As illustrated in FIG. 4, the processor may transit from its connected state 60 into one of the permanently disconnected states 62 or 64 respectively when the processor executes a HALT instruction or when the processor receives an asserted STPCLK_L signal. When the processor gets disconnected as a result of the STPCLK_L assertion, its disconnected state may be referred to as the 'Stop Grant Power Down (SGPD) State' 64. When the processor gets disconnected as a result of a HALT instruction, its disconnected state may be referred to as the 'Auto Halt Power Down (AHPD) State' 62.

When the processor 12 is disconnected from the interface bus 36, the processor may get reconnected to the interface bus in one of the three ways as illustrated in FIG. 4. Two of these three ways may result in a permanent reconnection of the processor to the interface bus. However, the third option may allow for a temporary reconnection of the processor to the interface bus. The processor may revert to its corresponding disconnected state upon exiting from the temporarily reconnected state.

First, the processor 12 may permanently reconnect from the SGPD state 64 via a deassertion of the STPCLK_L signal. Second, the processor may permanently reconnect from the AHPD state 62 via an assertion of one of the following interrupt signals (shown in FIG. 1): the INTR interrupt, the SMI_L interrupt, the NMI interrupt, the RESET_L signal, and the INIT_L interrupt. In an alternative embodiment, the I/O bridge 26 may also connect to the processor 12 via a FLUSH_L pin (not shown in FIG. 1). The FLUSH_L signal, when asserted, may force the processor to write back all the modified lines in the processor's internal data cache and invalidate (or flush) processor's internal code and data caches. In such an embodiment, the processor may permanently get reconnected to the interface bus 36 (from the AHPD state 62) via the assertion of the FLUSH_L signal. In still another embodiment, the processor 12 may recognize a debug request (DBREQ_L interrupt) from a debug device or logic (not shown in FIG. 1). The assertion of the DBREQ_L signal may force the processor to stop the normal execution of instructions and to respond to external debug requests. In such an embodiment, the processor may exit the AHPD state 62 and permanently get reconnected to the interface bus via an assertion of the DBREQ_L interrupt.

The microcode within the processor 12 may mask or unmask the recognition of the above-mentioned interrupt signals, except for the RESET_L signal that may not be masked by the processor microcode. In the preferred embodiment, however, all of these interrupt signals are generally unmasked unless an interrupt flag (IF) bit in a condition status register (not shown) within the processor 12 is set. When the IF bit is set, the INTR interrupt signal 31 (FIG. 1) may not be able to initiate a reconnection of the processor from the AHPD state 62.

The bus bridge 14 may receive probe requests from different devices within the computer system 10 through the corresponding buses connecting those devices with the bus bridge. A device within the system 10 may send a probe request (or a "probe") addressed to the processor 12 for a variety of reasons. For example, a probe may request the processor to send the contents of a specified number of lines in the internal data cache within the processor to the device that sent the probe. It may happen that the bus bridge 14 receives a probe while the processor 12 is in one of its low power states, i.e., either in the AHPD state 62 or in the SGPD state 64.

For temporary reconnection, the bus bridge 14 may assert the CONNECT pin 15 (FIG. 1) when the bus bridge needs to probe the processor 12 that is in either the AHPD state 62 or the SGPD state 64. In response to the CONNECT pin assertion, the processor may assert its PROCREADY line 17 (after the processor's internal clock is ramped up to the full frequency). This, in turn, transitions the processor state into a temporarily reconnected state 66. The bus bridge 14 may deassert the CONNECT pin after the processor completes servicing the probe request. The bus bridge may, thus, initiate disconnection of the processor 12 after the requested probe is serviced by the processor and the requested data, if any, are transferred to the bus bridge. The processor may, in response, deassert its PROCREADY signal, thereby getting disconnected from the interface bus 36. The processor's reconnection to the interface bus 36 may, thus, be temporary in the sense that upon deassertions of the CONNECT and the PROCREADY signals the processor 12, however, may revert to one of its permanently disconnected states (i.e., either the AHPD state 62 or the SGPD state 64) that the processor was in prior to transiting to the temporarily reconnected state 66 through the CONNECT pin 15 assertion by the bus bridge 14.

The processor 12 may also transition to its temporarily reconnected state 66 upon an assertion of the STPCLK_L signal 21 while the processor is in the AHPD state 62. The processor will temporarily reconnect to the interface bus 36 and will issue a Stop Grant special cycle command (discussed later with reference to FIG. 5A) to the bus bridge 14 through the interface bus 36. Upon completion of the processing of the Stop Grant special cycle, the processor may transition into the SGPD state 64. Thus, the processor may enter into another disconnected state (the SGPD state 64) from its original disconnected state, i.e., the AHPD state 62. The processor may therefore be considered "twice disconnected."

Figure 7:
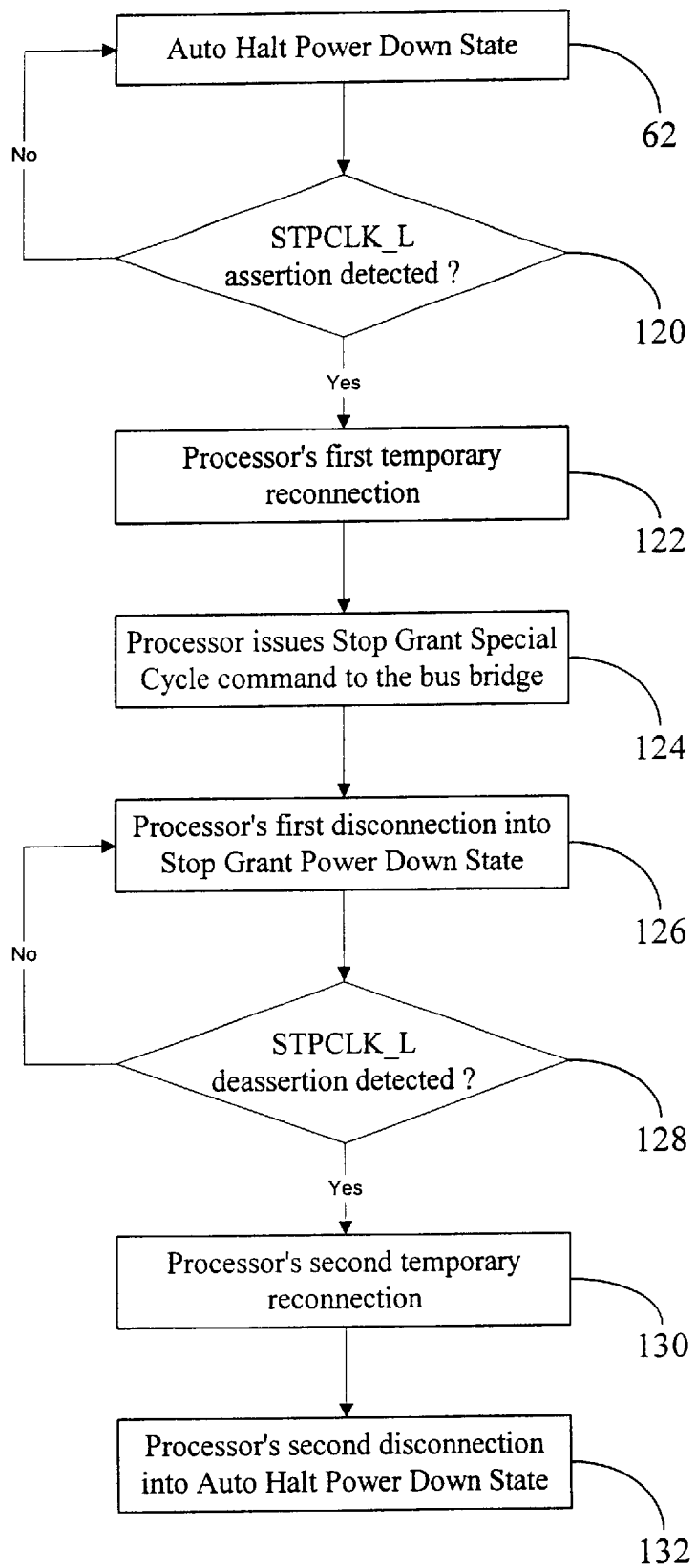
FIG. 7 is an exemplary flow-chart depicting temporary reconnection and "double disconnection" of the processor when the STPCLK_L signal is asserted while the processor is in a disconnected state due to the execution of the HALT instruction.

Once the processor is "twice disconnected", the deassertion of the STPCLK_L signal may not result in the processor transitioning into the permanently reconnected state 60. Instead, to exit the SGPD state 64, the processor may again enter into the temporarily reconnected state 66 upon deassertion of the STPCLK_L signal as is illustrated by the dotted arrows in FIG. 4. The processor may, then, transition into the AHPD state 62 from its temporary reconnection. Finally, the processor may need to exit the AHPD state—the state that the processor was in prior to being "twice disconnected"—through one of the interrupt signals (as described earlier) to permanently reconnect to the interface bus 36. A flow-chart illustration of the processor's "double disconnection" is depicted in FIG. 7.

It is noted that the processor may receive one or more interrupts from the I/O bridge 26 (FIG. 1) while the processor is in the SGPD state 64. In the preferred embodiment, the processor may latch the received interrupts and may service those interrupts once the processor exits the SGPD state 64 and enters into its permanently reconnected state 60. In an alternative embodiment, the processor may not service probes from the bus bridge or may not latch interrupts from the I/O bridge when in a low power state (i.e., in a permanently disconnected state 64) through the assertion of the STPCLK_L signal.

Figure 5A:
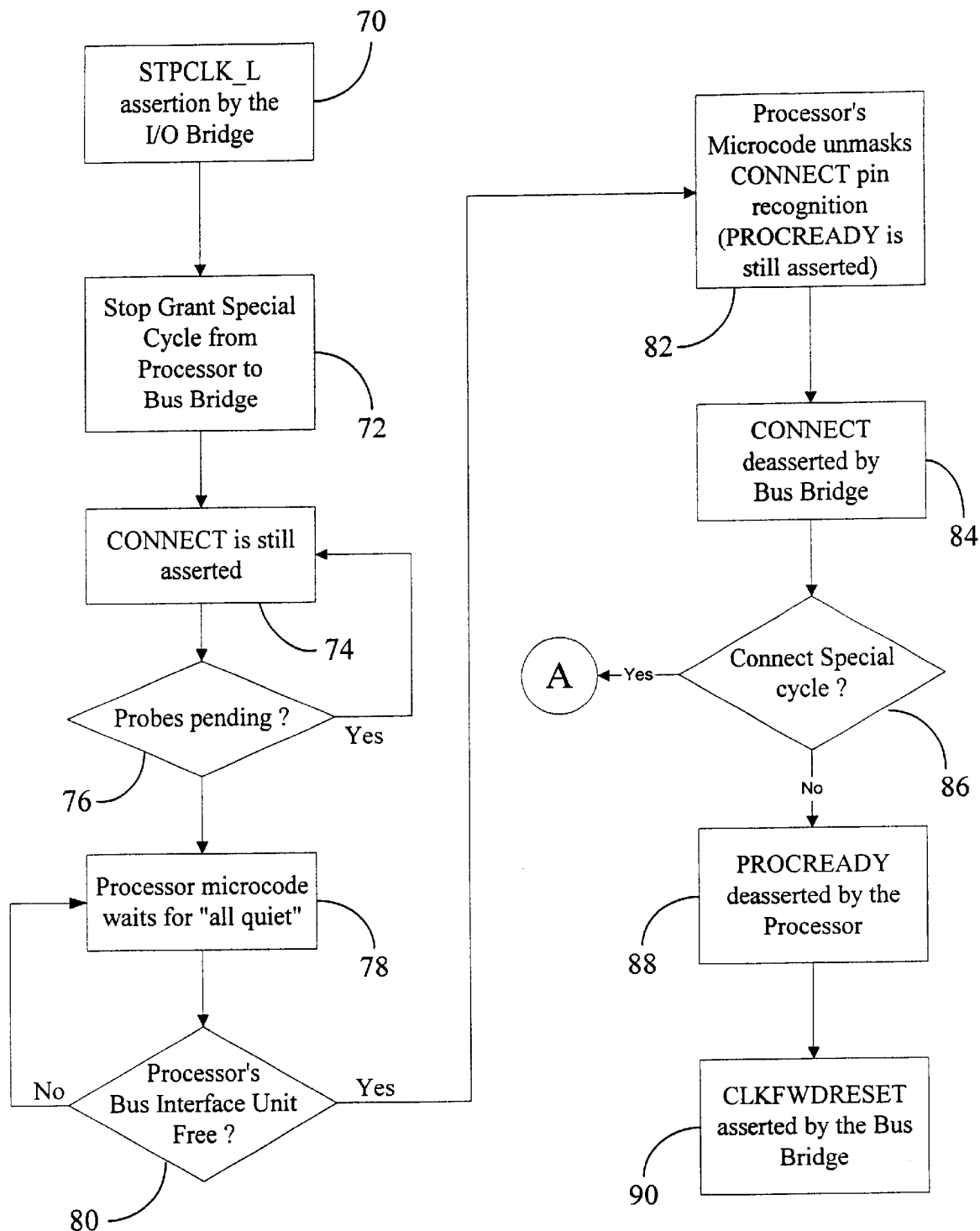
FIG. 5A is an exemplary flow-chart depicting different stages during the disconnection of the processor from the interface bus through the assertion of the STPCLK_L signal.

Referring now to FIG. 5A, an exemplary flow-chart is shown depicting different stages during the disconnection of the processor 12 (i.e., the processor entering the SGPD state 64, FIG. 4) from the interface bus 36 through the assertion of the STPCLK_L signal 21 (FIG. 1). Initially (block 70), the processor receives the STPCLK_L signal asserted by the I/O bridge 26 (FIG. 1). Prior to entering into a low power state in response to the STPCLK_L signal assertion, the processor may disconnect from the interface bus 36 to maintain the integrity of the clock forwarded interface 36 because the processor may not drive its forward clocks when in a low power state.

The processor may continue executing all outstanding instructions prior to issuing a Stop Grant special cycle command (block 72) to the bus bridge 14 across, for example, the processor address bus 13A. The Stop Grant command may inform the bus bridge of the processor's intent to enter into a low power state and to get disconnected from the interface bus 36. Under an exemplary protocol for the interface bus 36, the bus bridge 14 may assure "commitment" of the Stop Grant special cycle command conveyed to it by the processor 12. This means that the processor may expect the bus bridge to deassert the CONNECT pin 15, thereby initiating the disconnection of the processor from the interface bus.

The bus bridge may continue sending probes to the processor until all the probes pending at the bus bridge are serviced by the processor (blocks 74 and 76). The microcode within the processor may continue checking the status of the processor's Bus Interface Unit (BIU) to ascertain completion of pending transactions on the interface bus 36 (blocks 78, 80). In other words, the microcode waits for an "all quiet" indication from the BIU. When the BIU informs the microcode that the BIU is not "busy", the microcode may clear an internal state bit (not shown) within the processor 12. The clearing of the internal state bit unmasks the processor's recognition of the CONNECT pin (block 82). In other words, the processor may now recognize whether the CONNECT pin is asserted or deasserted. At this point in the disconnection process, the processor is still connected to the interface bus, i.e., both the CONNECT and the PROCREADY signals are still asserted (block 82).

The bus bridge 14 may determine when the processor's disconnection from the interface bus 36 may actually take place. In other words, as mentioned earlier, the bus bridge 14 may maintain the processor's connection to the interface bus 36 "alive" until all the probes pending at the bus bridge are serviced by the processor 12. When the bus bridge has no more probes to send, the bus bridge may deassert its CONNECT pin 15 (FIG. 1) in view of its "commitment" of the Stop Grant special cycle (block 84). Since the processor 12 has unmasked the CONNECT pin recognition, the processor 12 will now respect the CONNECT deassertion by the bus bridge 14. The processor may, in response, deassert its PROCREADY pin 17 (FIG. 1) (block 88). The processor may then be 10 considered permanently disconnected from the interface bus 36 as is illustrated and explained with reference to FIGS. 3 and 4. It is noted that the function depicted by block 84 in FIG. 5A may get performed prior to the function shown in block 82.

After deassertion of the PROCREADY signal by the processor, the bus bridge may then assert the CLKFWDRESET signal 19 (FIG. 1) (block 90) to ensure synchronous resetting of the clock forwarded interface logic units 38 and 40 within the processor 12 and the bus bridge 14 respectively when the processor next "wakes up" (i.e., when the processor 12 again connects to the interface bus 36). In one embodiment, the bus bridge may maintain the CLKFWDRESET signal asserted until the reconnection of the processor to the interface bus. Upon assertion of the CLKFWDRESET signal, the processor forward clocks are stopped and the clock forwarded data FIFO 42 is cleared as discussed earlier. The processor may then ramp down its internal clock to a low frequency, e.g., $\frac{1}{8}^{th}$ of the normal frequency, to save power.

The processor 12 may not deassert its PROCREADY line 17 (FIG. 1) in response to the CONNECT pin 15 deassertion by the bus bridge 14 if any condition that would "wake up" a disconnected processor has occurred. For example, the processor may receive a deassertion of the STPCLK_L signal 21 or an assertion of one or more of the interrupt signals 23, 25, 27, 29 and 31 after the processor sends the disconnect request to the bus bridge (i.e., the Stop Grant special cycle) but before the disconnection actually occurs. In such a situation, the processor may generate a Connect special cycle (block 86, FIG. 5A) addressed (e.g., on the processor address bus 13A) to the bus bridge rather than continuing with the disconnect sequence. The events constituting the Connect special cycle are illustrated in the flow-chart of FIG. 5B under the circled letter 'A'.

Figure 5B:
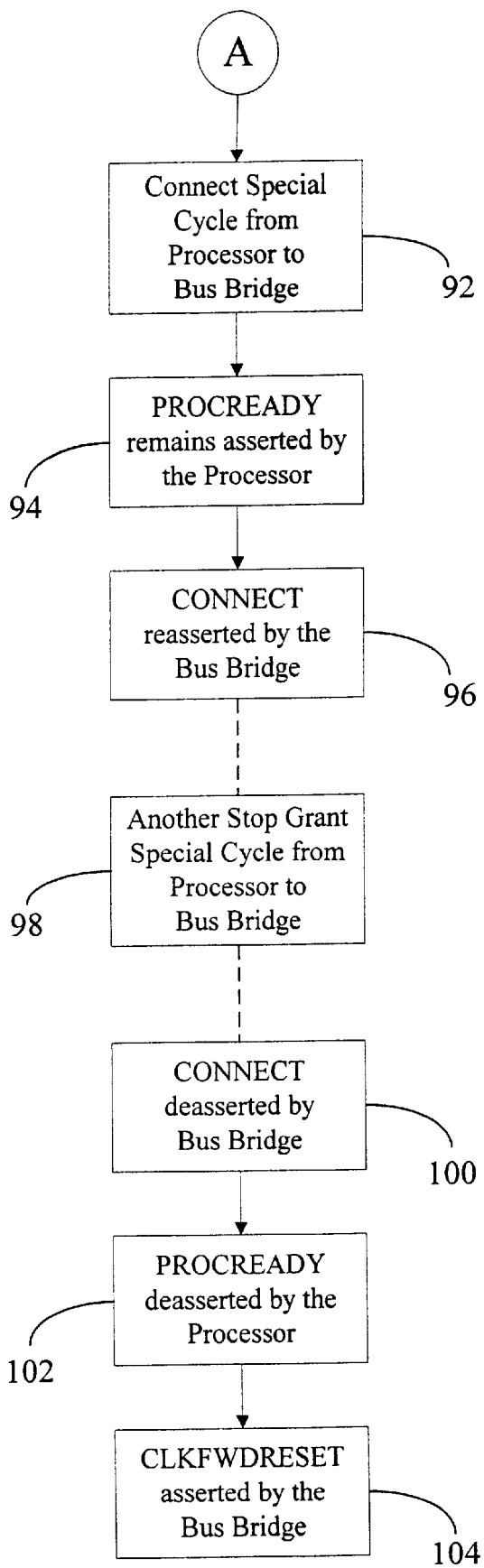
FIG. 5B is an example of a flow-chart for a connect special cycle that is generated during the disconnection of the processor through the assertion of the STPCLK_L signal as illustrated in FIG. 5A.

Referring now to FIG. 5B, the processor 12 may first issue the Connect special cycle command to the bus bridge 14 (block 92) and keep the PROCREADY signal asserted (block 94). In response to the Connect special cycle command, the bus bridge may cancel the processor disconnection process, and, may instead reassert (block 96) its earlier deasserted (block 84, FIG. 5A) CONNECT pin 15, thereby maintaining the processor in the "connected" state (as depicted in FIG. 3). In one embodiment, once connected, the processor may not be disconnected later from the interface bus by a unilateral deassertion of the CONNECT signal by the bus bridge. In other words, the processor may not allow the bus bridge to disconnect the processor from the interface bus in the absence of another indication of processor disconnection, e.g., another assertion of the STPCLK__L signal or execution by the processor of a HALT instruction. Block 98 in FIG. 5B illustrates one such event.

At the conclusion of another disconnection process (initiated, for example, by another Stop Grant special cycle command) that is similar to the one illustrated in FIG. 5A, the bus bridge may again deassert its CONNECT pin (block 100). The processor may eventually get disconnected from the interface bus by deasserting its PROCREADY signal in response to the CONNECT pin deassertion (block 102). Finally, the bus bridge may assert the CLKFWDRESET signal to ensure synchronous resetting of the clock forwarded interface logic units within the processor and the bus bridge when the processor "wakes up" again (block 104). The processor may then ramp down its internal clocks to enter into its power saving mode.

As mentioned before, the processor may also initiate a disconnect from the interface bus when the processor encounters a HALT instruction (replacing the STPCLK__L assertion at block 70 in FIG. 5A). In this case, the processor issues a Halt special cycle command to the bus bridge in place of the Stop Grant special cycle at block 72 in FIG. 5A. The remaining disconnection process illustrated in FIGS. 5A and 5B is the same for this situation when the processor executes a HALT instruction. For example, the processor may also initiate a Connect special cycle (marked by the circled letter 'A') and may eventually get disconnected after entering into, for example, another Halt special cycle instead of another Stop Grant special cycle shown at block 98 in FIG. 5B.

In one embodiment, the bus bridge 14 may provide a BIOS (Basic Input Output System) programmable register (not shown) in which the bus bridge may disconnect the processor 12 from clock forwarded interface bus 36 upon the occurrence of a Halt special cycle or a Stop Grant special cycle. Further, the bus bridge may disconnect the processor (i.e., both CONNECT and PROCREADY deasserted) from the interface bus 36 before the bus bridge issues the Halt special cycle or the Stop Grant special cycle to another system bus, e.g., the PCI bus 24.

As noted before, when the processor's microcode is involved in handling the disconnection of the processor (as illustrated in FIG. 5A), the microcode will keep the processor's recognition of the signal at the CONNECT pin masked until the processor's bus interface unit (BIU) is not busy with any pending operations. For example, prior to entering the AHPD state 62 (FIG. 4), the processor needs to ensure that it disconnects (from the interface bus 36) only when there are no interrupts pending at the processor that were asserted after the time the Halt special cycle was sent to the bus bridge and that require servicing by the processor. In general, the microcode may wait until the Halt special cycle is committed by the bus bridge and the BIU signals "all quiet" before the microcode unmasks the CONNECT pin recognition.

The microcode may still continue checking for any asserted interrupts that may keep the processor from ramping down its clocks because even though the processor issued the Halt special cycle the processor may not enter its "asleep" state in response to the CONNECT pin deassertion unless the processor has no work to do. The microcode may keep the CONNECT pin masked until any asserted interrupt that may keep the processor "awake" is cleared. The microcode may first clear the asserted interrupt before unmasking the CONNECT pin recognition to prevent the processor from ramping down its internal clocks before the microcode is ready for the disconnection.

Figure 6:
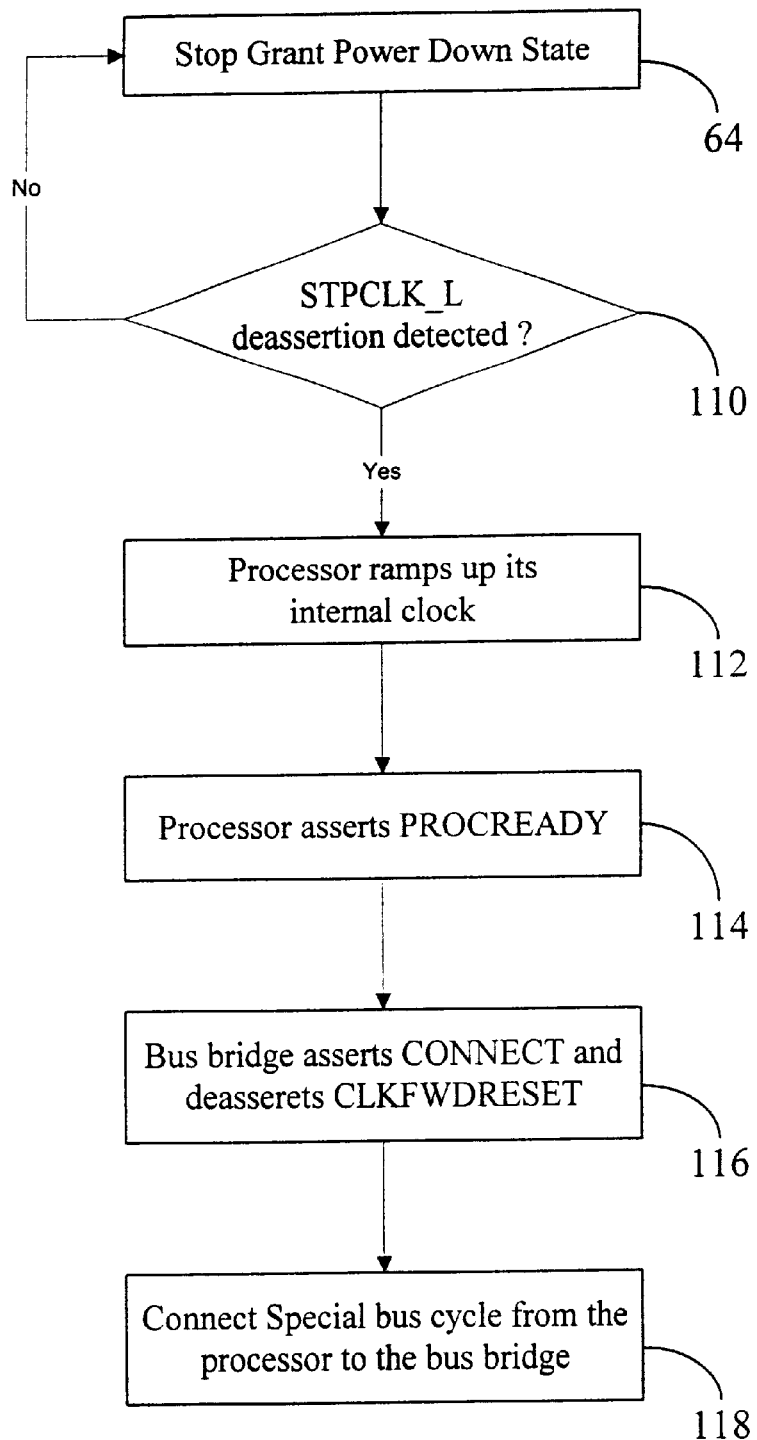
FIG. 6 is a simplified flow-chart for the reconnection of the processor to the interface bus after the processor was disconnected through the assertion of the STPCLK_L signal.

Turning now to FIG. 6, a simplified flow-chart for the reconnection of the processor 12 to the interface bus 36 after the processor was disconnected through the assertion of the STPCLK__L signal 21 (FIG. 1) is illustrated. When the processor is in the SGPD state 64 (FIG. 4), the deassertion of the STPCLK__L signal 21 may initiate a permanent reconnection of the processor without resetting the processor (e.g., processor's internal registers or flag bits). A temporary reconnection may occur in the event of the CONNECT pin assertion as discussed earlier with reference to FIG. 4. In one embodiment, some other pins on the processor may have a theoretical ability to initiate the processor's reconnection from the SGPD state, but these pins may be masked by the processor's microcode from doing so.

When the processor detects a STPCLK__L deassertion (block 110) while in the SGPD state 64, the processor may begin to ramp the internal processor clock to its full frequency (block 112). Once the internal processor clock has stabilized (e.g., with respect to acceptable phase error), the processor may assert its PROCREADY pin 17 (block 114). In response to the PROCREADY assertion, the bus bridge may be required to assert the CONNECT signal 15 and deassert the CLKFWDRESET signal 19 (block 116). The processor may get reconnected to the interface bus upon assertion of the CONNECT signal by the bus bridge as is illustrated in FIG. 3. The processor and the bus bridge forward clocks may begin upon the deassertion of the CLKFWDRESET signal, and both the processor and the bus bridge may begin bus activities once a predetermined time has elapsed since the deassertion of the CLKFWDRESET signal. In one embodiment, the predetermined time may equal four clock cycles of the system clock (i.e., SYSCLK or SYSCLK__L in FIG. 2).

In one embodiment, the first bus activity by the processor upon reconnection is driving a Connect special bus cycle to the bus bridge (block 118). The bus bridge may interpret the issuance of the Connect special bus cycle as establishing that the processor is fully "awake" and that the processor may not be placed into its "asleep" state by deasserting the CONNECT pin without first receiving a Stop Grant special cycle or a Halt special cycle from the processor. The processor may not generate the Connect special cycle in the absence of a STPCLK__L deassertion while in the SGPD state 64 (FIG. 4) or an assertion of one or more of the interrupt signals (described earlier) while in the AHPD state 62 (FIG. 4). In other words, the processor 12 may not generate the Connect special cycle when the processor enters into its temporarily reconnected state 66 (FIG. 4) via the CONNECT pin assertion by the bus bridge 14. Therefore, a purpose of the Connect special bus cycle is to indicate when the processor determines that it is "awake" for reasons other than (or in addition to) the bus bridge's probing of the processor. The Connect special cycle may, therefore, keep the bus bridge from trying to disconnect the processor that has work to do.

While in the AHPD state 62, the pin assertions of one or more of the interrupt signals 23, 25, 27, 29 and 31 may initiate a reconnection of the processor 12 to the interface bus 36 as discussed earlier with reference to FIG. 4. When the processor detects the assertion of at least one of these interrupt signals (similar to block 110), the processor may reconnect to the interface bus in an identical fashion (i.e., in a manner similar to that depicted by the blocks 112, 114, 116 and 118 in FIG. 6) to that described with reference to FIG. 6 for a reconnection from the SGPD state 64.

As described earlier with reference to FIG. 4, the processor 12 may enter into its temporarily reconnected state 66 in one of three ways: (1) Bus bridge's 14 assertion of the CONNECT pin while the processor 12 is in its SGPD state 64; (2) Bus bridge's assertion of the CONNECT pin while the processor is in its AHPD state 62; or (3) I/O bridge's 26 assertion of the STPCLK_L signal 21 while the processor is in its AHPD state 62. Some exemplary steps forming part of the third method of temporary reconnection are illustrated in the flow-chart of FIG. 7. The temporary reconnection and "double disconnection" of the processor (described earlier with reference to FIG. 4) when the STPCLK_L signal is asserted while the processor is in a disconnected state due to the execution of the HALT instruction is also clearly illustrated in FIG. 7 through the flow-chart blocks 120, 122, 124, 126, 128, 130 and 132.

In one embodiment, the processor 12 may continue to sample interrupts while in a disconnected state, e.g., in the AHPD state 62 or in the SGPD state 64. These interrupts may get sampled while the processor is ramping down its internal clock. In other words, the interrupts may get sampled into the processor clock domain at indeterministic times. Therefore, it is desirable to prevent the processor from servicing these interrupts while ramping up its internal clock during its reconnection to the interface bus 36. As mentioned earlier with reference to FIG. 6, the bus bridge 14 may deassert the CLKFWDRESET signal 19 when the bus bridge completes the reconnection of the processor 12 to the interface bus 36 (via an assertion of the CONNECT pin 15). Upon reconnection, the processor may have its internal clock fully ramped up. Therefore, the deassertion of the CLKFWDRESET signal may provide a deterministic time in which the processor 12 may start servicing any interrupts received by the processor while the processor was ramping down its internal clock after being disconnected from the interface bus 36. Therefore, such interrupts may be masked from being recognized by the processor prior to the deassertion of the CLKFWDRESET signal 19.

It is noted that the previous discussion of power management for a processor involving exchange of various signals between the processor and a bus bridge may be easily applied in case of two other devices (which may not be a processor and a bus bridge pair) that are connected via a clock forwarded interface in a computer system.

The foregoing discloses a method and apparatus for controlling power management state transitions between two devices (here, a processor and a bus bridge) that are connected through a clock forwarded interface bus in a computer system. The disconnection of the processor from the interface bus (for example, to save power consumption by the processor) may be accomplished through a logical connection-disconnection protocol implemented between the processor and the bus bridge and without burdening the processor to monitor the interface bus for activity. The combination of CONNECT, PROCREADY and CLKFWDRESET signals allow the processor and the bus bridge to accomplish processor disconnection and reconnection without jeopardizing the integrity of the clock forwarded interface. Broadly speaking, forward clocks and any associated data are consistently transmitted between two devices (here, a processor and a bus bridge) in a deterministic manner.

While the invention is susceptible of various modifications and alternative forms, specific embodiments thereof are shown by way of examples in the drawings and are herein described in detail. It should be understood, however, that the drawings and the detailed description thereto are not intended to limit the invention to the particular forms disclosed, but, on the contrary, the intention is to cover all such modifications, equivalents and alternatives as may fall within the spirit and scope of the present invention as defined by the appended claims.

What is claimed is:

1. A computer system comprising:
   an interface comprising one or more buses;
   a processor connected to the interface, the processor configured to transmit at least a first forwarded clock corresponding to at least one of the one or more buses; and
   a bus bridge connected to the interface, the bus bridge configured to transmit at least a second forwarded clock corresponding to at least one of the one or more buses;
   wherein the bus bridge is coupled to receive the first forwarded clock for capturing data transmitted by the processor, and wherein the processor is coupled to receive the second forwarded clock for capturing data transmitted by the bus bridge; and
   wherein the bus bridge is configured to use a first signal to indicate whether or not the processor is to be disconnected from the interface, and wherein the processor is configured to use a second signal to indicate whether or not the processor is to be disconnected from the interface, and wherein the processor is disconnected from the interface responsive to both the first signal and the second signal indicating that the processor is to be disconnected from the interface.

2. The computer system as recited in claim 1 wherein the processor is configured to transmit an indication on one of the one or more buses that the processor is to enter a low power mode, and wherein the processor is disconnected from the interface to enter the low power mode.

3. The computer system as recited in claim 2 wherein the low power mode is entered responsive to the processor executing a HALT instruction.

4. The computer system as recited in claim 2 wherein the low power mode is entered responsive to a stop clock signal received by the processor.

5. The computer system as recited in claim 2 wherein the processor is configured to complete execution of outstanding instructions prior to transmitting the indication.

6. The computer system as recited in claim 2 wherein the processor is configured to exit the low power mode, and wherein the processor is configured to indicate that the processor is to connect to the interface via the second signal.

7. The computer system as recited in claim 6 wherein the bus bridge is configured to indicate that the processor is to connect to the interface via the first signal responsive to the second signal indicating that the processor is to connect to the interface.

8. The computer system as recited in claim 1 wherein the bus bridge is configured to use a third signal to cause the processor to cease transmitting the first forwarded clock.

9. The computer system as recited in claim 8 wherein the bus bridge comprises a first interface logic unit configured to receive the data responsive to the first forwarded clock, wherein the bus bridge is configured to clear the first interface logic unit responsive to the third signal, and wherein the processor comprises a second interface logic unit configured to receive data from the one or more buses responsive to the second forwarded clock, wherein the processor is configured to clear the second interface logic unit responsive to the third signal.

10. The computer system as recited in claim 1 wherein, if the first signal indicates that the processor is to be disconnected from the interface, the processor is configured to transmit an indication to reconnect on the one or more buses, and wherein the bus bridge is configured to indicate, via the first signal, that the processor is not to be disconnected from the interface in response to the indication to reconnect.

11. A bus bridge comprising circuitry for connecting to an interface comprising one or more buses, wherein the circuitry is coupled to receive a first forwarded clock corresponding to at least one of the one or more buses, wherein the circuitry is configured to capture data responsive to the first forwarded clock, and wherein the circuitry is configured to transmit a second forwarded clock corresponding to at least one of the one or more buses, and wherein the circuitry is configured to use a first signal to indicate whether or not a processor is to be disconnected from the interface, and wherein the circuitry is coupled to receive a second signal to indicate whether or not the processor is to be disconnected from the interface, and wherein the processor is disconnected from the interface responsive to both the first signal and the second signal indicating that the processor is to be disconnected from the interface.

12. The bus bridge as recited in claim 11 wherein the circuitry is configured to receive an indication on one of the one or more buses that the processor is to enter a low power mode, and wherein the circuitry is configured to transmit the first signal in the first state responsive to the indication.

13. The bus bridge as recited in claim 12 wherein the circuitry is configured to receive the second signal indicating that the processor is to connect to the interface, and wherein the circuitry is configured to respond to the second signal indicating that the processor is to connect to the interface by transmitting the first signal indicating that the processor is to connect to the interface.

14. The bus bridge as recited in claim 11 wherein the circuitry is configured to use a third signal to cause the processor to cease transmitting the first forwarded clock.

15. The bus bridge as recited in claim 14 wherein the circuitry comprises a first buffer configured to receive the data responsive to the first forwarded clock, wherein the bus bridge is configured to clear the first buffer responsive to the third signal.

16. The bus bridge as recited in claim 11 wherein, if the first signal indicates that the processor is to be disconnected from the interface and the circuitry receives an indication to reconnect on the one or more busses, the circuitry is configured to indicate, via the first signal, that the processor is not to be disconnected from the interface.

17. A processor comprising circuitry for connecting to an interface comprising one or more buses, wherein the circuitry is configured to transmit at least a first forwarded clock corresponding to at least one of the one or more buses, and wherein the circuitry is coupled to receive at least a second forwarded clock corresponding to at least one of the one or more buses, wherein the circuitry is configured to capture data on the at least one of the one or more buses, and wherein the processor is coupled to receive a first signal to indicate whether or not the processor is to be disconnected from the interface, and wherein the circuitry is configured to use a second signal to indicate whether or not the processor is to be disconnected from the interface, and wherein the processor is disconnected from the interface responsive to both the first signal and the second signal indicating that the processor is to be disconnected from the interface.

18. The processor as recited in claim 17 wherein the circuitry is configured to transmit an indication on one of the one or more buses that the processor is to enter a low power mode, and wherein the processor is disconnected from the interface to enter the low power mode.

19. The processor as recited in claim 18 wherein the low power mode is entered responsive to the processor executing a HALT instruction.

20. The processor as recited in claim 18 wherein the low power mode is entered responsive to a stop clock signal received by the processor.

21. The processor as recited in claim 18 wherein the processor is configured to complete execution of outstanding instructions prior to transmitting the indication.

22. The processor as recited in claim 18 wherein, to exit the low power mode, the circuitry is configured to indicate that the processor is to connect to the interface via the second signal.

23. The processor as recited in claim 17 wherein, in response to a third signal received by the processor, the circuitry is configured to cease transmitting the first forwarded clock.

24. The processor as recited in claim 23 further comprising a buffer configured to store data received in response to the second forwarded clock, wherein the buffer is cleared responsive to the third signal.

25. The processor as recited in claim 17 wherein, if the first signal indicates that the processor is to be disconnected from the interface, the circuitry is configured to transmit an indication to reconnect on the one or more buses.

26. A method comprising:
transmitting, from a processor, at least a first forwarded clock corresponding to at least one of one or more buses comprising an interface;
transmitting, from a bus bridge, at least a second forwarded clock corresponding to at least one of the one or more buses;
the bus bridge receiving the first forwarded clock for capturing data transmitted by the processor;
the processor receiving the second forwarded clock for capturing data transmitted by the bus bridge;
the bus bridge using a first signal to indicate whether or not the processor is to be disconnected from the interface; and
the processor using a second signal to indicate whether or not the processor is to be disconnected from the interface, wherein the processor is disconnected from the interface responsive to both the first signal and the second signal indicating that the processor is to be disconnected from the interface.

27. The method as recited in claim 26 further comprising the processor transmitting an indication on one of the one or more buses that the processor is to enter a low power mode, and wherein the processor is disconnected from the interface to enter the low power mode.

28. The method as recited in claim 27 further comprising entering the low power mode responsive to the processor executing a HALT instruction.

29. The method as recited in claim 27 further comprising entering the low power mode responsive to a stop clock signal received by the processor.

30. The method as recited in claim 27 further comprising the processor completing execution of outstanding instructions prior to transmitting the indication.

31. The method as recited in claim 27 further comprising the processor exiting the low power mode, the exiting including the processor, on the second signal, indicating that the processor is to be connected to the interface.

32. The method as recited in claim 31 further comprising the bus bridge indicating, on the first signal, that the processor is to be connected to the interface responsive to the second signal indicating that the processor is to be connected to the interface.

33. The method as recited in claim 26 further comprising the bus bridge causing the processor to cease transmitting the first forwarded clock.

34. The method as recited in claim 26 further comprising, if the first signal indicates that the processor is to be disconnected from the interface, the processor transmitting an indication to reconnect on the one or more busses; and the bus bridge indicating, via the first signal, that the processor is not to be disconnected from the interface in response to the indication to reconnect.

* * * * *